US012300871B2

(12) United States Patent
Fackler et al.

(10) Patent No.: US 12,300,871 B2
(45) Date of Patent: May 13, 2025

(54) ANTENNA MOUNTING SYSTEM

(71) Applicant: Outdoor Wireless Networks LLC, Claremont, NC (US)

(72) Inventors: Karl-Heinz Fackler, Wemding (DE); Xian Zhang, Suzhou (CN); Gregory Orseno, Homer Glen, IL (US); Andreas Huebener, Rosenheim (DE)

(73) Assignee: Outdoor Wireless Networks LLC, Richardson, TX (US)

( * ) Notice: Subject to any disclaimer, the term of this patent is extended or adjusted under 35 U.S.C. 154(b) by 148 days.

(21) Appl. No.: 18/043,886

(22) PCT Filed: Jul. 14, 2021

(86) PCT No.: PCT/US2021/041634

§ 371 (c)(1),
(2) Date: Mar. 2, 2023

(87) PCT Pub. No.: WO2022/046308

PCT Pub. Date: Mar. 3, 2022

(65) Prior Publication Data

US 2023/0327317 A1 Oct. 12, 2023

Related U.S. Application Data

(60) Provisional application No. 63/073,815, filed on Sep. 2, 2020.

(30) Foreign Application Priority Data

Aug. 31, 2020 (CN) ......................... 202010892296.8

(51) Int. Cl.
*H01Q 1/12* (2006.01)
*H01Q 1/00* (2006.01)
*H01Q 1/24* (2006.01)

(52) U.S. Cl.
CPC ........... *H01Q 1/1221* (2013.01); *H01Q 1/007* (2013.01); *H01Q 1/246* (2013.01)

(58) Field of Classification Search
CPC ...... H01Q 1/1221; H01Q 1/007; H01Q 1/246; H01Q 1/1214
See application file for complete search history.

(56) References Cited

U.S. PATENT DOCUMENTS

| | | | | |
|---|---|---|---|---|
| 9,564,673 | B1 * | 2/2017 | Markey | H01Q 1/50 |
| 2015/0207202 | A1 * | 7/2015 | Ortiz | H01Q 1/1214 248/539 |
| 2019/0237845 | A1 * | 8/2019 | Ge | H01Q 1/2291 |

FOREIGN PATENT DOCUMENTS

| | | |
|---|---|---|
| CN | 207624899 U | 7/2018 |
| CN | 210200943 U | 3/2020 |

OTHER PUBLICATIONS

Enuotek, "Angled Recessed Ceiling Spotlights 6W LED Cool White Lighting 5000K Retrofit Halogen Downlights LED for Sloped Ceiling Hole Diameter 70-80MM AC100-240V", downloaded Jun. 2, 2021 from www.enoutek.com, pp. 1 through 3.

(Continued)

*Primary Examiner* — David E Lotter
(74) *Attorney, Agent, or Firm* — Fogg & Powers LLC

(57) ABSTRACT

An antenna mounting system that includes abase member, a plurality of spaced retaining attachment section and retaining members is provided. The base member has a central passage that is configured to receive an antenna shaft. The plurality of spaced retaining attachment sections are coupled to the base member. A retaining member is coupled to each retaining attachment section. Each retaining member has an engagement portion that is configured to engage an upper surface of a ceiling and a biasing portion that is configured (Continued)

to provide a bias force on the engagement portion to engage the upper surface of the ceiling.

16 Claims, 11 Drawing Sheets

(56) References Cited

OTHER PUBLICATIONS

International Searching Authority, "International Search Report and Written Opinion", from PCT Application No. PCT/US2021/041634, Nov. 11, 2021, pp. 1 through 10, Published in: KR.

* cited by examiner

ANTENNA MOUNTING SYSTEM

CROSS-REFERENCE TO RELATED APPLICATIONS

This Application claims priority to International Patent Application No. PCT/US2021/041634 filed on Jul. 14, 2021, which claims priority to Chinese Application No. 202010892296.8 filed on Aug. 31, 2020, same title herewith, and U.S. Provisional Application Ser. No. 63/073,815, same title herewith, filed on Sep. 2, 2020, all of which are incorporated in their entirety herein by reference.

BACKGROUND

Wireless cellular service providers use base stations to implement wireless communication links between user equipment, such as mobile phones, and the service provider's core network. A base station is typically in communication with one or more antennas that receive and transmit radio frequency signals to and from user equipment. The coverage area of a base station is limited by the transmit power of the associated signals. Moreover, the coverage provided by the transmitted signals is influenced by many other factors such as physical obstacles and interference. Hence, wireless coverage in buildings and stadiums has been traditionally poor when served only from conventional "macro" base stations.

One way that a wireless cellular service provider can improve the coverage provided by a given base station or group of base stations is by using a distributed antenna system (DAS). In a typical DAS, radio frequency (RF) signals are transported between a master unit and one or more remote antenna units using one or more transport cables. The master unit is communicatively coupled to one or more base stations.

Traditionally, RF signals transmitted from the base stations (also referred to here as "downlink RF signals") are received at the master unit. The master unit uses the downlink RF signals to generate one or more downlink transport signals that are distributed to one or more of the remote antenna units over the transport cables. Each such remote antenna unit receives a downlink transport signal and generates a version of the downlink RF signals based on the downlink transport signal and causes the generated downlink RF signals to be radiated from at least one antenna coupled to or included in that remote antenna unit. A similar process is performed in the uplink direction. RF signals transmitted are from user equipment (also referred to here as "uplink RF signals"). Each such uplink RF signal is intended for a base station coupled to the master unit. Each remote antenna unit receives uplink RF signals transmitted from user equipment within its associated coverage area.

Each remote antenna unit uses the received uplink RF signals to generate an uplink transport signal that is transmitted from the remote antenna unit to the master unit. The master unit receives uplink transport signals from the various remote antenna units coupled to it. For each base station coupled to the master unit, the master unit combines uplink signals intended for that base station that are received from the various remote antenna units.

For each base station coupled to the master unit, the master unit ultimately generates uplink RF signals from the combined uplink signals for that base station, which are provided to that base station. Each remote antenna unit can be coupled to each master unit either directly or indirectly via one or more intermediate devices (such as another remote antenna unit or an expansion unit). In this way, the coverage of each base station can be expanded using the DAS.

The antennas used to radiate the downlink RF signals to user equipment and receive uplink signals from the user equipment are mounted in areas needing coverage by the DAS such as ceilings of buildings. Typical mounting includes the use of a hollow pole passing through a hole in a suspended ceiling that is retained by the suspended ceiling with a nut. The antenna is then mounted on an end of the pole extending through the ceiling. Other known mounting systems may reduce the effective height of the antenna mounting level which reduces a safety space between people and a beam radiation level.

SUMMARY

The following summary is made by way of example and not by way of limitation. It is merely provided to aid the reader in understanding some of the aspects of the subject matter described. Embodiments provide an antenna mounting system to mount a DNS antenna in a suspended ceiling.

In one embodiment, an antenna mounting system that includes a base member, a plurality of spaced retaining attachment section and retaining members is provided. The base member has a central passage that is configured to receive an antenna shaft. The plurality of spaced retaining attachment sections are coupled to the base member. A retaining member is coupled to each retaining attachment section. Each retaining member has an engagement portion that is configured to engage an upper surface of a ceiling and a biasing portion that is configured to provide a bias force on the engagement portion to engage the upper surface of the ceiling.

In another example embodiment, an antenna mounting system that includes a base member, a sidewall, a plurality of spaced retaining attachment sections and a retaining member coupled to retaining attachment section is provided. The base member includes a disk portion that has a first surface and a second surface. The disk portion has first a central passage that is configured to receive an antenna shaft. The sidewall extends from the first surface of the disk portion at least partially around the central passage. The plurality of spaced retaining attachment sections are coupled the disk portion and sidewall. The retaining member has an engagement portion that is configured to engage an upper surface of a ceiling and a biasing portion that is configured to provide a bias force on the engagement portion to engage the upper surface of the ceiling.

In yet another embodiment, an antenna mounting system and antenna for a distributed antenna system is provided. The system includes a base member, a plurality of spaced retaining attachment sections, and a retaining member coupled to each retaining attachment section. The base member includes a disk portion that has a first surface and a second surface. The disk portion has a central passage. The plurality of spaced retaining attachment sections are coupled to the first surface of the disk portion around the central passage. The retaining member is coupled to each retaining attachment section. The retaining member has an engagement portion that is configured to engage an upper surface of ceiling and a biasing portion that is configured to provide a bias force on the engagement portion to engage the upper surface of the ceiling. The system further includes an antenna system including an antenna, an antenna shaft and a retaining nut. The antenna has a first surface that is configured to engage the second surface of the disk portion.

The antenna shaft is configured to be received within the central passage of the disk portion of the base member. The retaining nut is configured to threadably engage threads on the antenna shaft to couple the antenna system to the disk portion of the base member.

BRIEF DESCRIPTION OF THE DRAWINGS

Embodiments can be more easily understood and further advantages and uses thereof will be more readily apparent, when considered in view of the detailed description and the following figures in which.

In accordance with common practice, the various described features are not drawn to scale but are drawn to emphasize specific features relevant to the subject matter described. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the embodiments, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Figure 1:
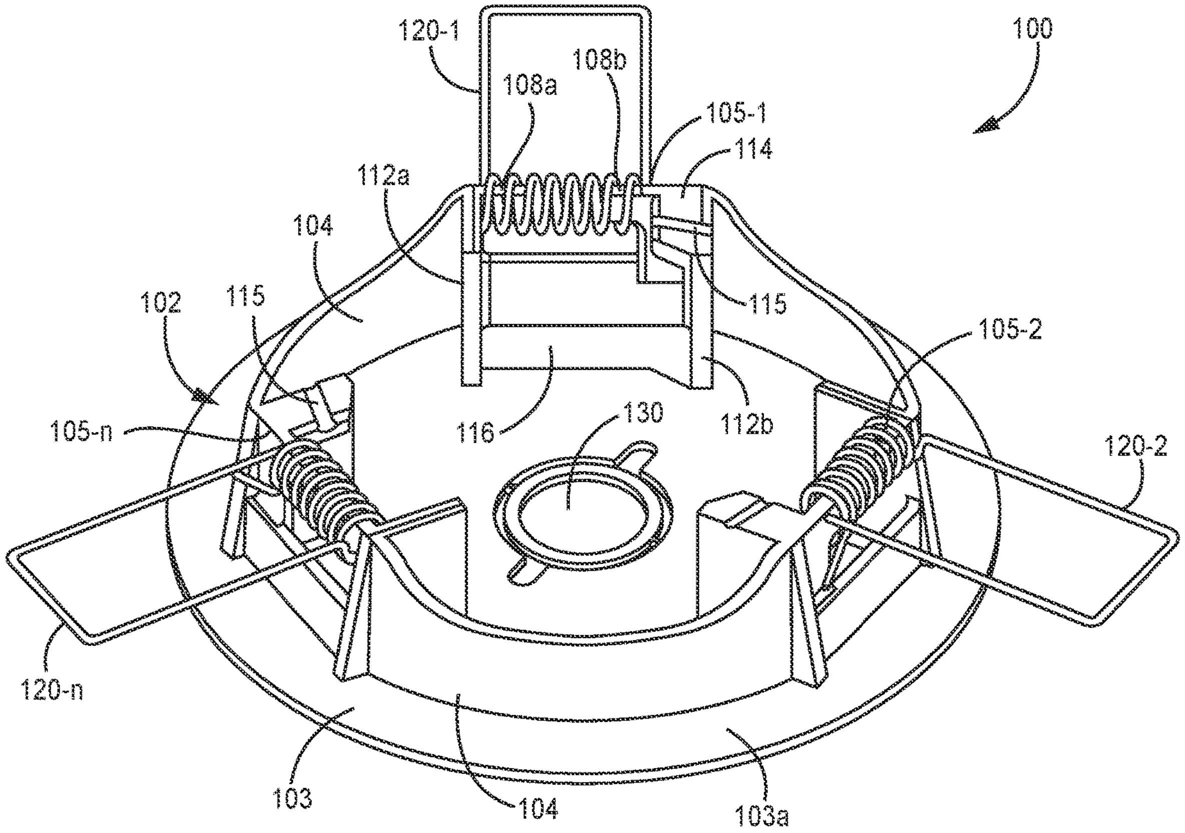
FIG. 1 is a side perspective view of an antenna mounting system according to one exemplary embodiment.

Embodiments provide an antenna mounting system to mount a DNS antenna in a suspended or false ceiling. FIG. 1 illustrates a side perspective view of an antenna mounting system 100 of one example embodiment. The antenna mounting system 100 includes a base member 102. The base member 102, in this example, includes a disk portion 103 with a central passage 130. The disk portion 103 includes a first surface 103*a* upon which a sidewall 104 extends around the central passage 130. Within the sidewall 104 is formed a plurality of spaced retaining attachment sections 105-1 through 105-*n*. The retaining attachment sections may generally be identified by 105. Retaining members 120-1 through 120-*n* are coupled to respective retaining attachment sections 105. The retaining members may generally be identified by 120.

Figure 2:
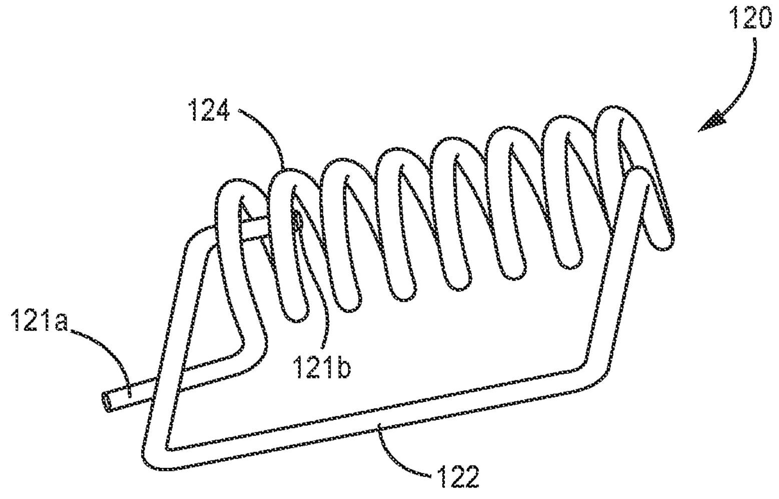
FIG. 2 is a side perspective view of a retaining member of the antenna mounting system of FIG. 1 according to one exemplary embodiment.

An example of a retaining member 120 is illustrated in FIG. 2. The retaining member 120, in this example, includes an engaging portion 122 that is generally U-shaped and a biasing portion 124. The biasing portion 124, in this example, is formed with coils. The retaining member 120 further includes first end portion 121*a* and a second end portion 121*b* that may engage portions of a respective retaining attachment section 105, as discussed below, to generate a bias force on the engaging portion 122.

Figure 3:
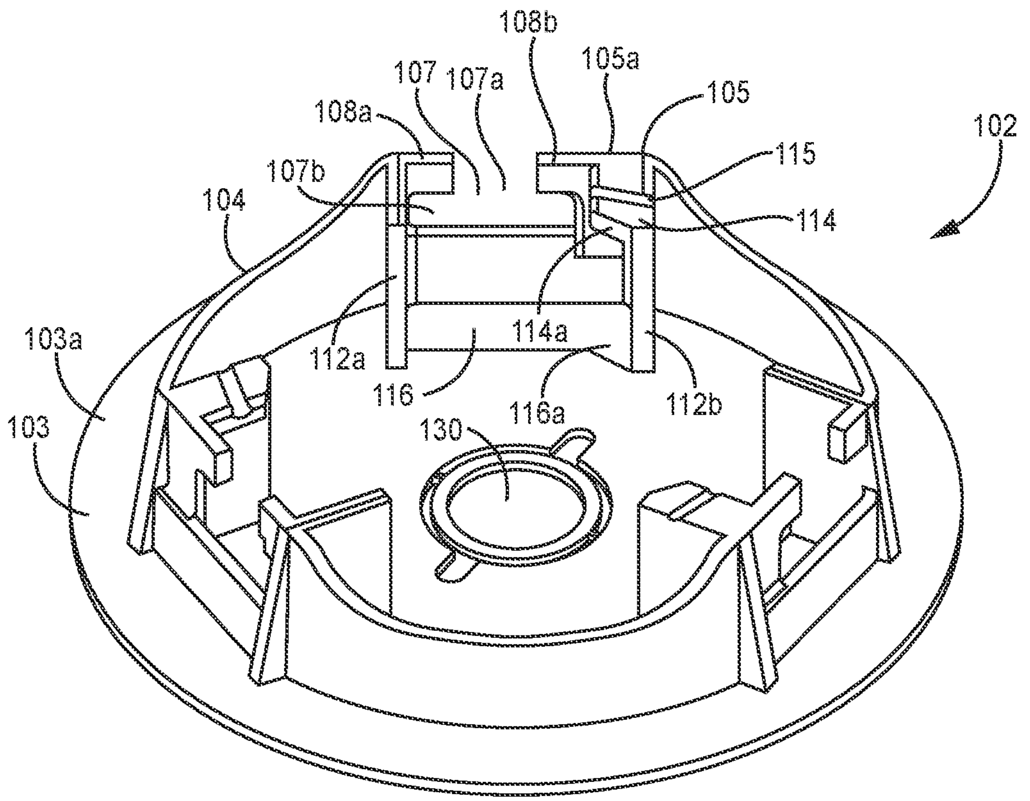
FIG. 3 is a side perspective view of the antenna mounting system of FIG. 1 without the retaining members.
Figure 4:
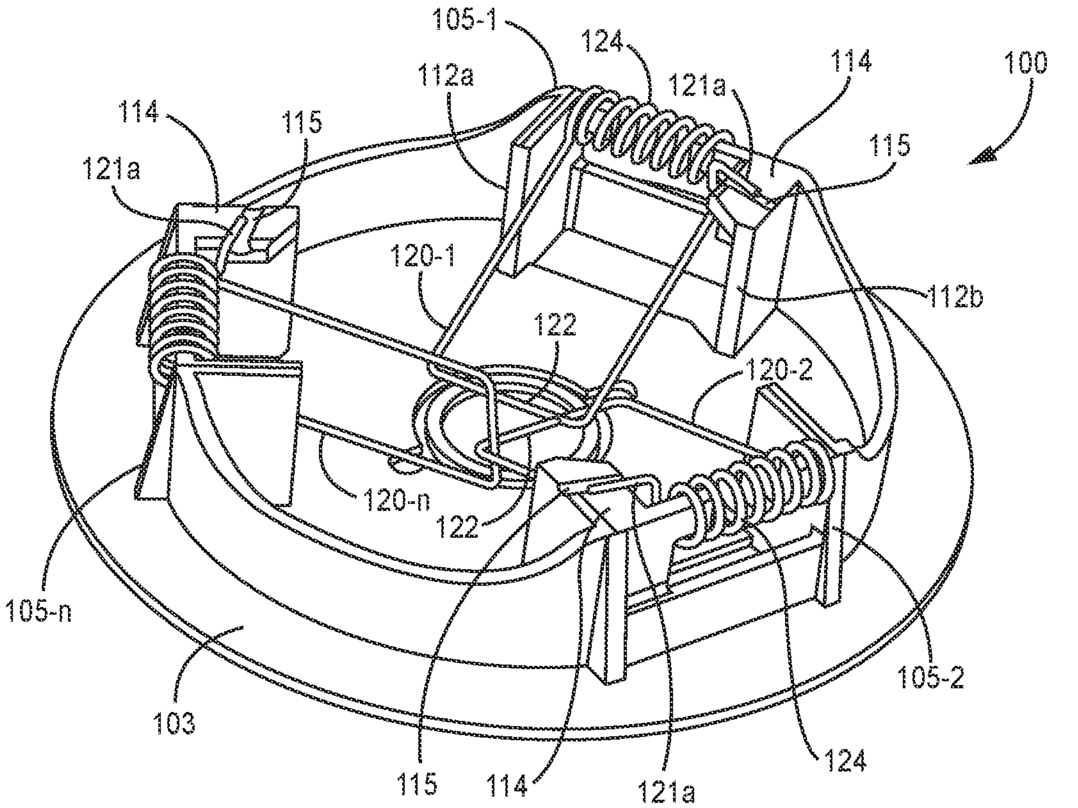
FIG. 4 is a side perspective view of the antenna mounting system of FIG. 1 with the retaining members.
Figure 5:
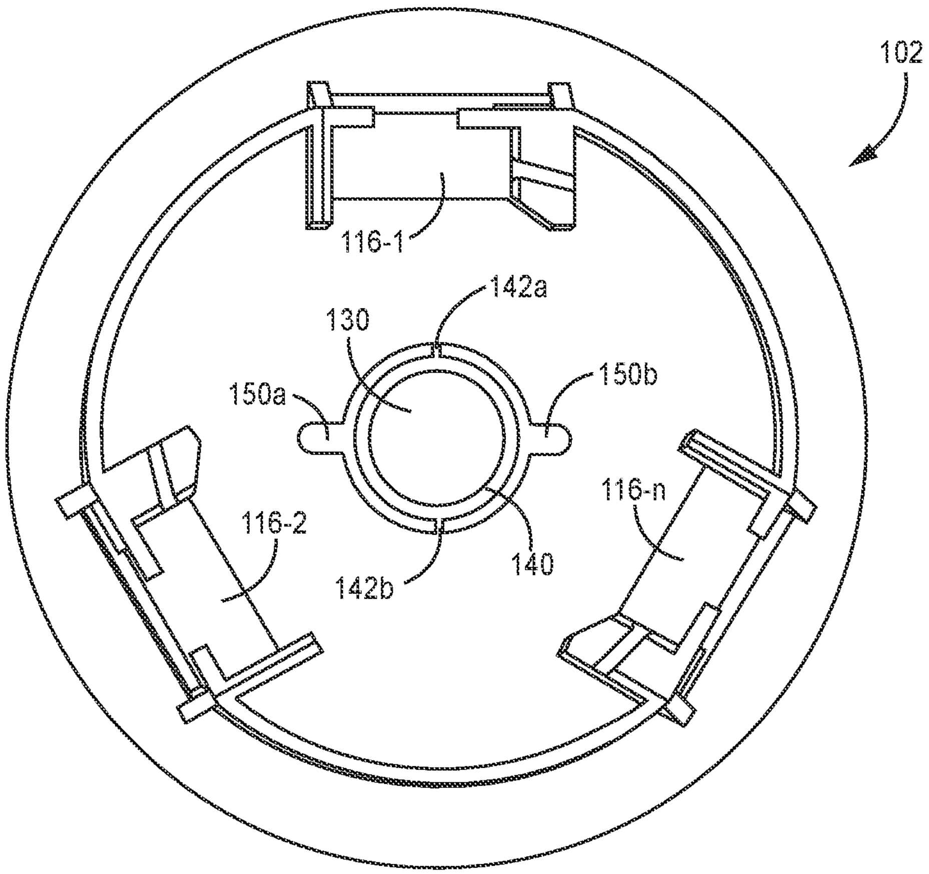
FIG. 5 is a top view of the antenna mounting system of FIG. 1 without the retaining members.

The base member 102, of an embodiment is further illustrated in detail in FIGS. 3 through 5. In particular, FIG. 3 illustrates the side perspective view of the base member 102, FIG. 4 illustrates a top view of the base member 102 and FIG. 5 illustrates a bottom view of the base member 102. As discussed above, the base member 102 includes a disk portion 103. The disk portion 103 includes the first surface 103*a* and an oppositely positioned second surface 103*b*.

As also discussed above, a sidewall 104 extends from the first surface 103*a* of the disk portion 103. The sidewall 104 in this example embodiment is generally cylindrical in shape. Each retaining attachment section 105 formed in the sidewall 104 includes an arm cutout section 107 as best illustrated in FIG. 3. The arm cutout section 107 forms retaining arms 108*a* and 108*b* in the respective retaining attachment section 105. The arm cutout section 107 includes a mounting cutout region 107*a* and a holding cutout region 107*b*. The mounting cutout region 107*a* extends from a top edge 105*a* of the retaining attachment section 105 to the holding cutout region 107*b*. The holding cutout region 107*b* is larger than the mounting cutout region 107*a*. The retaining arms 108*a* and 108*b* extend towards each other and are separated by the mounting cutout region 107*a*.

Each respective retaining member 120 is coupled to an associated retaining attachment section 105. In particular, the biasing portion 124 is positioned so that opposite end sections of the coils of the biasing portion 124 of the retaining member 120 are received around respective retaining arms 108*a* and 108*b* of the retaining attachment section 105 as best illustrated in FIG. 1. In an embodiment, the second end portion 121*b* of the retaining member is received within a bore (not shown) in a respective one of the retaining arms 108*a* and 108*b*.

Each retaining member 120 further includes a pair of spaced retaining walls 112*a* and 112*b* as best illustrated in FIG. 3. The retaining walls 112*a* and 112*b* extend inward toward the central passage 130. One of the retaining walls, such as retaining wall 112*b*, includes a ledge portion 114. The ledge portion 114 is coupled to an outer edge of the retaining wall 112*b*. The ledge portion 114 includes a surface groove 115. The surface grooves 115 in respective ledge portions 114 are designed to hold first end portion 121*a* of a respective retaining member 120 as illustrated in FIG. 4. The first end portion 121*a* of each respective retaining member 120 is positioned with a respective surface groove 115 to cause a pre-tension within the retaining member 120. This pre-tension, as described below, automatically causes the respective retaining member 120 to engage an upper surface of a suspended celling during installation.

As best illustrated in FIG. 5, the disk portion 103 further incudes retaining member cutout sections 116-1 through 116-*n*. The retaining member cutout section may be generally indicated by 116. The cutouts 116-1 through 116-*n* are used during production of the antenna mounting system 100.

In other embodiments with a different production process the cutout 116-1 through 116-*n* are not used. Each cutout section 116, in the example of FIG. 4, is associated with a respective retaining attachment section 105. Moreover, each cutout section 116 extends between retaining walls 112*a* and 112*b* of its associated retaining attachment section 105. As best illustrated in FIG. 3, each cutout section 116 incudes a wider extending portion 116*a* that is positioned under a ledge portion 114 of an associated retaining wall 112*b*. In the example embodiment of the antenna mounting system 100, the wider extending portion 116*a* generally follows the shape of an edge 114*a* of its associated retaining wall 112*b*.

Figure 6:
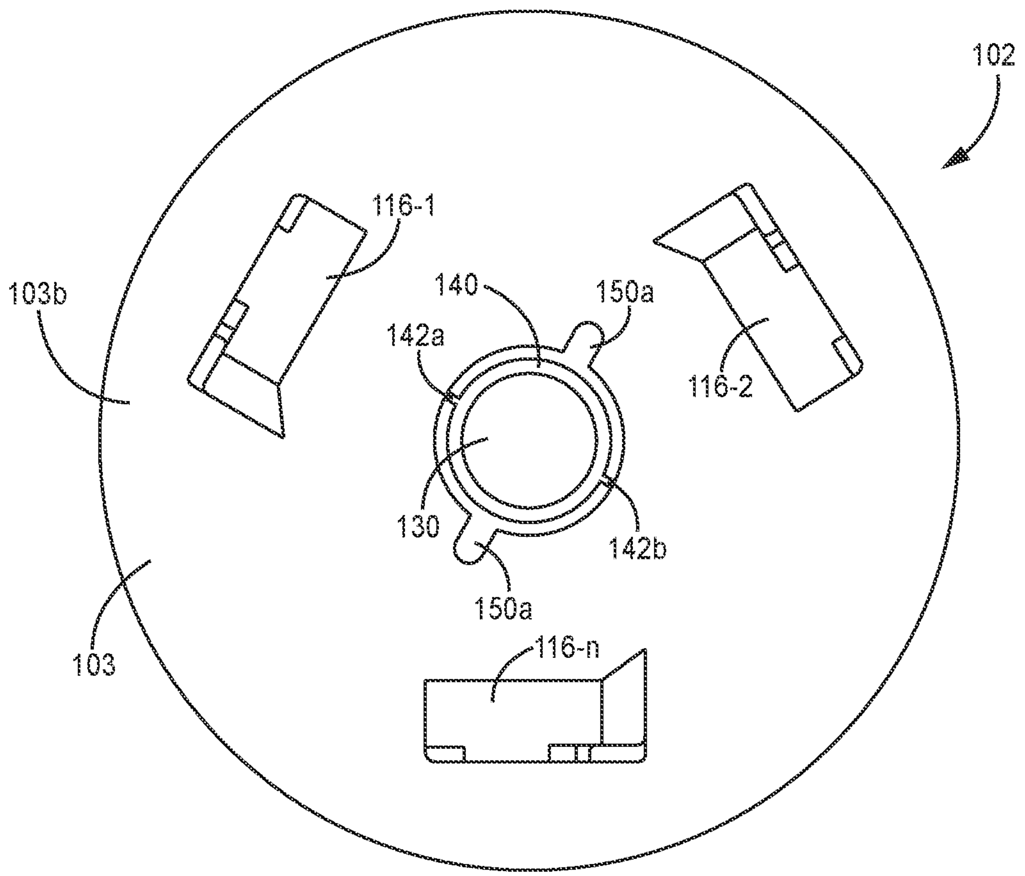
FIG. 6 is a bottom view of the antenna mounting system of FIG. 1 without the retaining members.

As best seen in FIGS. 5 and 6, the disk portion 103 in this example embodiment includes a ring portion 140 that defines the central passage 130. The ring portion 140 is attached to the disk portion 103 via opposably positioned attaching members 142*a* and 142*b*. The ring portion 140 can be selectively removed from the disk portion 103 to form a larger central passage 130 when needed. The ring portion 140 may be removed by rotating the ring portion 140 relative to disk portion 103. This rotational motion will break the attaching member 142*a* and 142*b* allowing the ring portion 140 to be removed. This embodiment further includes domed cutout sections 150*a* and 150*b* in the disk portion 103. The domed cutout sections 150*a* and 150*b* extend into the disk portion 103 from opposable sides of the ring portion 140. Further, the domed cutout sections 150*a* and 150*b* are positioned 90 degrees from the attaching members 142*a* and 142*b* in this example embodiment. The domed cutout sections 150*a* and 150*b* provide extra room for equipment, such as cables, to pass through if needed. In other embodiments, different designs for cutout sections 150*a* and 150*b* may be used such as, but not limited to, n-fold designs.

As discussed above, the antenna mounting system 100 provides a mounting system in a suspended ceiling for an antenna, such as an antenna used in a DAS. An example if an antenna system 200 mounted to the antenna mounting system 100 is illustrates in FIG. 7. An antenna shaft 204, that is attached to the antenna 202, is positioned within the central passage 130 in the disk portion 103 of the antenna mounting system 100. A threaded retaining nut 206, that threadably engages a threaded portion of the antenna shaft 204, locks the antenna 202 to the antenna mounting system 100. As further illustrated, communication cables 210 and 212 that are in communication with the antenna 202 are housed within the antenna shaft 204.

Figure 7:
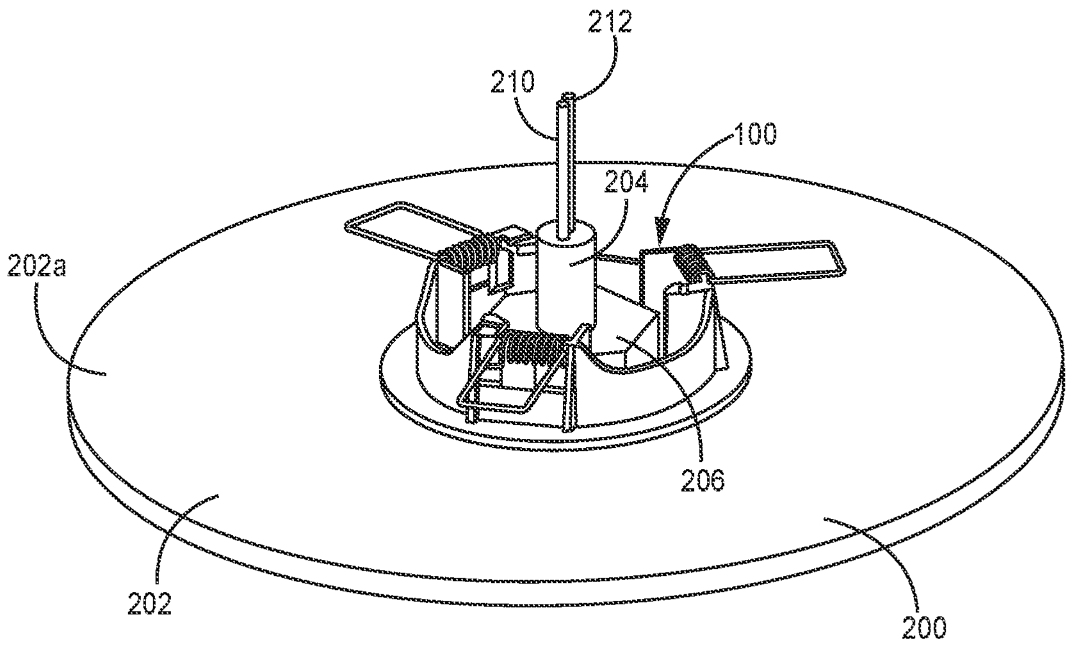
FIG. 7 is a side perspective view of an antenna attached to the antenna mounting system of FIG. 1.
Figure 8:
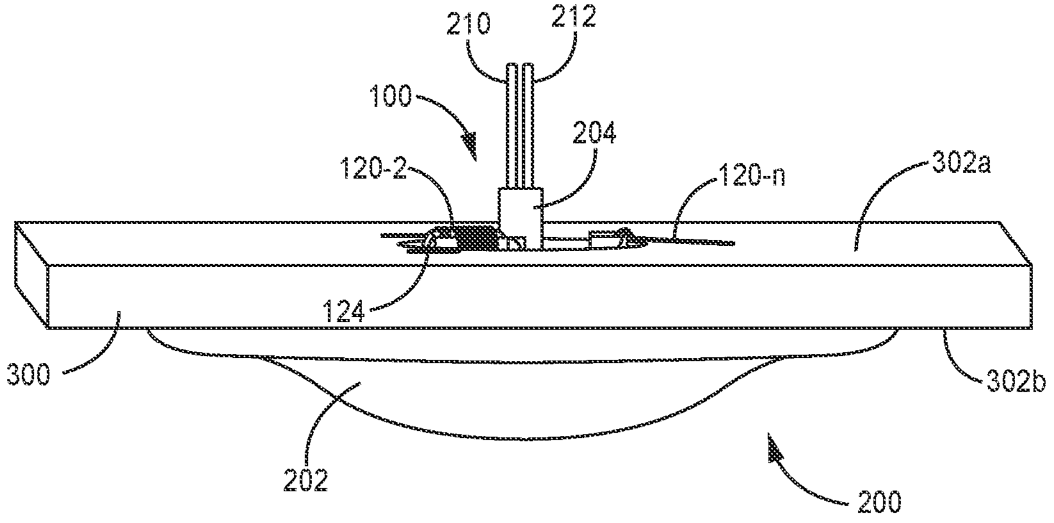
FIG. 8 is a side perspective view of the antenna mounting system of FIG. 1 and the antenna mounted in a suspended ceiling.
Figure 9:
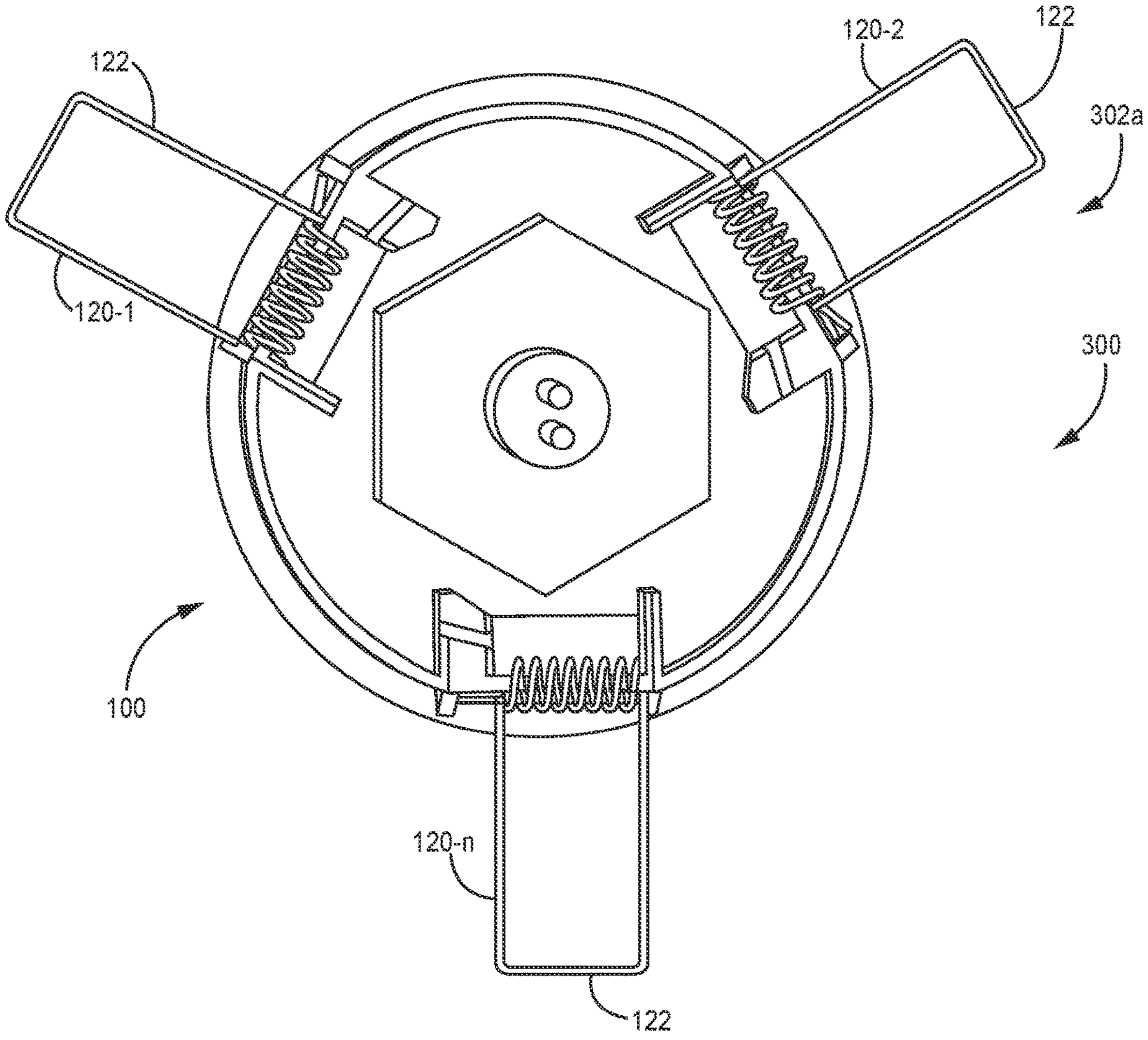
FIG. 9 is a top view of the antenna mounting system of FIG. 1 and the antenna mounted in a suspended ceiling.
Figure 10:
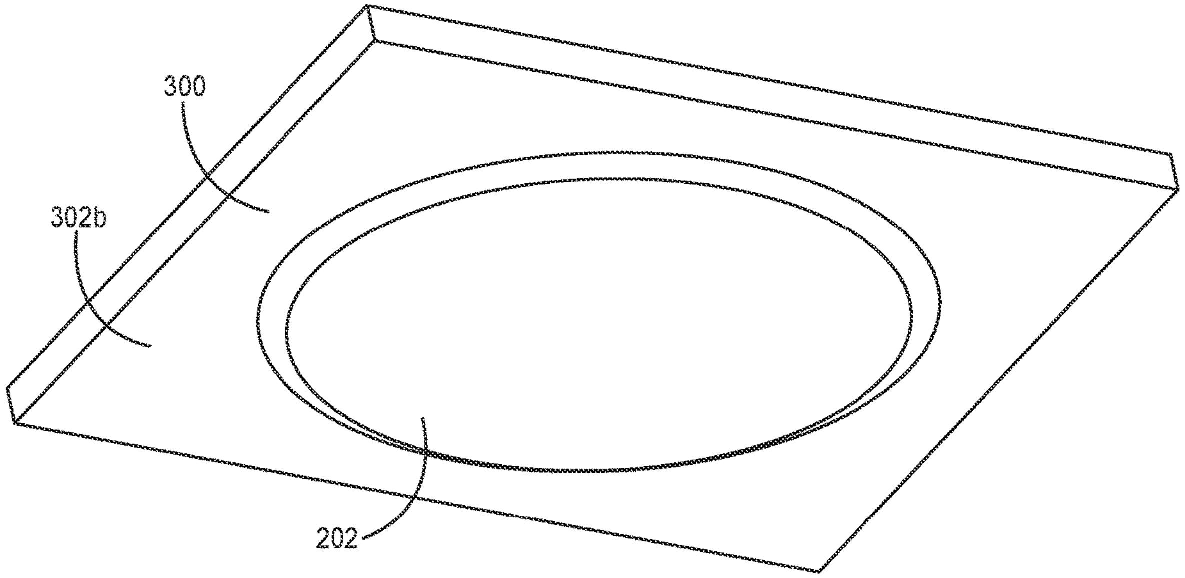
FIG. 10 is a bottom view of the antenna mounting system of FIG. 1 and the antenna mounted in a suspended ceiling.

An illustration of the antenna mounting system 100 mounting the antenna system 200 to a suspended ceiling 300 is illustrated in FIGS. 8 through 10. As best illustrated in FIG. 9, the engaging portion 122 of each retaining member 120-1 through 120-*n* engages an upper surface 302*a* of the suspended ceiling 300. The biasing portion 124 of each retaining member 120-1 through 120-*n* provides a bias force on the engaging portion 122 to engage the upper surface 302*a* of the suspended ceiling 300. This force along with an upper surface 202*a* of the antenna 202 (as best illustrated in FIG. 7) abutting a lower surface 302*b* of the suspended ceiling 300 retains the antenna system 200 in place in the suspended ceiling 300.

In mounting the antenna mounting system 100 and antenna system 200 to a suspended ceiling 300, a hole is cutout of the suspended ceiling 300. The communication cables 210 and 212 are routed through the hole in the suspended ceiling 300 and the antenna shaft 204 and are coupled to the antenna system 200. The antenna shaft 204 is positioned through the central passage 130 in the disk portion 103 of the antenna mounting system 100. The threaded retaining nut 206 is then used to threadably engages a threaded portion of the antenna shaft 204 to lock the antenna 202 to the antenna mounting system 100. The engaging portions 122 of the retaining members 120 are positioned in a straight up position by a technician to allow the sidewall 104 of the base member to be received within the hole of the suspended ceiling 300. Once the engaging portions 122 clear the upper surface 302*a* of the suspended ceiling 300, the biasing portions 124 of the retaining members 120 cause the engaging portions 122 of the retaining members 120 to rotate to engage the upper surface 302*a* of the suspended ceiling 300 thereby automatically locking the antenna mounting system 100 and antenna system 200 to the suspended ceiling 300.

Figure 11:
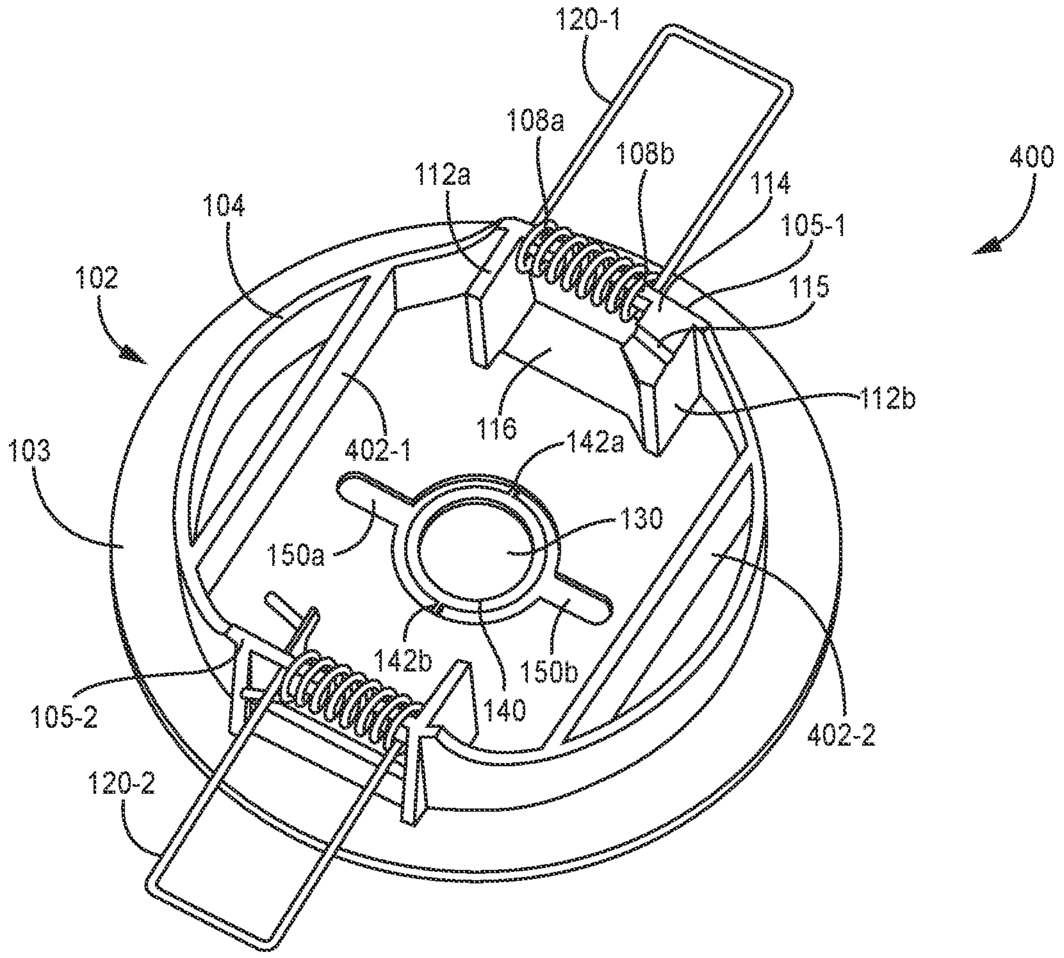
FIG. 11 is a side perspective view of another antenna mounting system according to one exemplary embodiment.

FIG. 11 illustrates another example of an antenna mounting system 400 that includes two retaining attachment sections 105-1 and 105-2 with two retaining members 120-1 and 120-2. Similar to the examples discussed above, the disk portion 103 of the base member 102 includes a central passage 130 and each retaining attachment section 105-1 and 105-2 includes spaced retaining walls 112*a* and 112*b* to retain an associated retaining member 120-1 and 120-2. The example of FIG. 11 further includes support walls 402-1 and 402-2. The support walls 402-1 and 402-2, in this example, are opposably positioned and are coupled between sections of sidewall 104. Further the support walls 402-1 and 402-2 of this example are positioned within a parameter defined by the sidewall 104 and are spaced apart from each other by at least the retaining attachment sections 105-1 and 105-2.

EXAMPLE EMBODIMENTS

Example 1 includes an antenna mounting system including a base member, a plurality of spaced retaining attachment section and retaining members. The base member has a central passage that is configured to receive an antenna shaft. The plurality of spaced retaining attachment sections are coupled to the base member. A retaining member is coupled to each retaining attachment section. Each retaining member has an engagement portion that is configured to engage an upper surface of a ceiling and a biasing portion that is configured to provide a bias force on the engagement portion to engage the upper surface of the ceiling.

Example 2 includes the antenna mounting system of Example 1, further wherein the base member includes a disk portion and a sidewall. The disk portion includes the central passage. The sidewall extends from a first surface of the disk portion at least partially around the central passage. Each retaining attachment section is located within the sidewall.

Example 3 includes the antenna mounting system of any of the Examples 1-2, wherein at least one of the plurality of spaced retaining attachment sections further includes a first retaining wall and a second retaining wall that is spaced from the first retaining wall. The first retaining wall and the second retaining wall, at least in part, extend from the sidewall towards the central passage.

Example 4 includes the antenna mounting system of Example 3, further including a first retaining arm and a second retaining arm. The first retaining arm extends from the first retaining wall. The first retaining arm is configured to hold a first portion of the biasing portion of the retaining member. The second retaining arm extends from the second retaining wall. The second retaining arm is configured to hold a second portion of the biasing portion of the retaining member. Further wherein the first retaining arm extends from the first retaining wall towards the second retaining arm and the second retaining arm extends from the second retaining wall towards the first retaining arm.

Example 5 includes the antenna mounting system of any of the Examples 3-4, further including a ledge portion that is coupled to an end of one of the first and second retaining walls, the ledge portion including a retaining groove.

Example 6 includes the antenna mounting system of any of the Examples 3-5, wherein the disk portion has a retaining member cutout section for at least one retaining attachment section. The retaining member cutout section located between the first retaining wall and the second retaining wall of the at least one retaining attachment section.

Example 7 includes the antenna mounting system of any of the Examples 2-6, further including a ring portion that defines the central passage. The ring portion is attached to the disk portion of the base member via opposable positioned attaching members.

Example 8 includes the antenna mounting system of Example 7, wherein the disk portion of the base member has a pair of opposable positioned domed cutout sections. The opposable positioned domed cutout sections positioned between the ring portion and the central passage.

Example 9 includes the antenna mounting system of any of the Examples 28, wherein the disk portion further includes a second surface configured to engage a surface of an antenna.

Example 10 includes an antenna mounting system including a base member, a sidewall, a plurality of spaced retaining attachment sections and a retaining member coupled to retaining attachment section. The base member includes a disk portion that has a first surface and a second surface. The disk portion has first a central passage that is configured to receive an antenna shaft. The sidewall extends from the first surface of the disk portion at least partially around the central passage. The plurality of spaced retaining attachment sections are coupled the disk portion and sidewall. The retaining member has an engagement portion that is configured to engage an upper surface of a ceiling and a biasing portion that is configured to provide a bias force on the engagement portion to engage the upper surface of the ceiling.

Example 11 includes an antenna mounting system of Example 10, wherein each retaining attachment section further includes a first retaining wall and a second retaining wall that is spaced from the first retaining wall. The first retaining wall and the second retaining wall at least in part extend from the sidewall towards the central passage. A first retaining arm extends from the first retaining wall. The first retaining arm is configured to hold a first portion of the biasing portion of the retaining member. A second retaining arm extends from the second retaining wall. The second retaining arm is configured to hold a second portion of the biasing portion of the retaining member. Further wherein the first retaining arm extends from the first retaining wall towards the second retaining arm and the second retaining arm extends from the second retaining wall towards the first retaining arm.

Example 12 includes the antenna mounting system of any of the Examples 10-11, further including a ledge portion coupled to an end of the of the second retaining wall, the ledge portion including a retaining groove.

Example 13 includes the antenna mounting system of any of the Examples 10-12, wherein the disk portion has a retaining member cutout section for each retaining attachment section. Each retaining member cutout section is located between the first retaining wall and the second retaining wall of an associated retaining attachment section.

Example 14 includes the antenna mounting system of any of the Examples 10-13, further including a ring portion that defines the central passage. The ring portion is attached to the disk portion of the base member via opposable positioned attaching members.

Examples 15 includes an antenna mounting system and antenna for a distributed antenna system, the system includes a base member, a plurality of spaced retaining attachment sections, and a retaining member coupled to each retaining attachment section. The base member includes a disk portion that has a first surface and a second surface. The disk portion has a central passage. The plurality of spaced retaining attachment sections are coupled to the first surface of the disk portion around the central passage. The retaining member is coupled to each retaining attachment section. The retaining member has an engagement portion that is configured to engage an upper surface of ceiling and a biasing portion that is configured to provide a bias force on the engagement portion to engage the upper surface of the ceiling. The system further includes an antenna system including an antenna, an antenna shaft and a retaining nut. The antenna has a first surface that is configured to engage the second surface of the disk portion. The antenna shaft is configured to be received within the central passage of the disk portion of the base member. The retaining nut is configured to threadably engage threads on the antenna shaft to couple the antenna system to the disk portion of the base member.

Example 16 includes the system of claim 15, wherein the base member further includes a sidewall extending from the first surface of the disk portion at least partially around the central passage.

Example 17 includes the system of any of the Examples 15-16, wherein each retaining attachment section further includes a first retaining wall, second retaining wall, a first retaining arm and a second retaining arm. The second retaining wall is spaced from the first retaining wall. The first retaining wall and the second retaining wall at least in part extend from the sidewall towards the central passage. The first retaining arm extends from the first retaining wall. The first retaining arm is configured to hold a first portion of the biasing portion of the retaining member. The second retaining arm extends from the second retaining wall. The second retaining arm is configured to hold a second portion of the biasing portion of the retaining member. Further wherein the first retaining arm extends from the first retaining wall towards the second retaining arm and the second retaining arm extends from the second retaining wall towards the first retaining arm.

Example 18 includes the system of any of the Examples 15-17, further including a ledge portion that is coupled to an end of the second retaining wall. The ledge portion includes a retaining groove.

Example 19 includes the system of any of the Examples 17-18, wherein the disk portion has a retaining member cutout section for each retaining attachment section. Each retaining member cutout section is located between the first retaining wall and the second retaining wall of an associated retaining attachment section.

Example 20 includes the system of any Examples 15-20, further including a ring portion that defines the central passage. The ring portion is attached to the disk portion of the base member via opposable positioned attaching members.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. An antenna mounting system comprising:
a base member, the base member having a central passage configured to receive an antenna shaft, wherein the base member includes,
a disk portion, the disk portion having the central passage, wherein the disk portion of the base member has a pair of opposable positioned domed cutout sections,
a sidewall extending from a first surface of the disk portion at least partially around the central passage, each retaining attachment section located within the sidewall and
a ring portion defining the central passage, the ring portion attached to the disk portion of the base member via opposable positioned attaching members, the opposable positioned domed cutout sections of the disk portion positioned between the ring portion and the central passage;
a plurality of spaced retaining attachment sections coupled to the base member; and
a retaining member coupled to each retaining attachment section, each retaining member having an engagement portion configured to engage an upper surface of a ceiling and a biasing portion configured to provide a bias force on the engagement portion to engage the upper surface of the ceiling.

2. The antenna mounting system of claim 1, wherein at least one of the plurality of spaced retaining attachment sections further includes: a first retaining wall; and a second retaining wall spaced from the first retaining wall, the first retaining wall and the second retaining wall at least in part extending from the sidewall towards the central passage.

3. The antenna mounting system of claim 1, further comprising: a first retaining arm extending from the first retaining wall, the first retaining arm configured to hold a first portion of the biasing portion of the retaining member; and a second retaining arm extending from the second retaining wall, the second retaining arm configured to hold a second portion of the biasing portion of the retaining member, further wherein the first retaining arm extends from the first retaining wall towards the second retaining arm and the second retaining arm extends from the second retaining wall towards the first retaining arm.

4. The antenna mounting system of claim 2, further comprising:
a ledge portion coupled to an end of one of the first and second retaining walls, the ledge portion including a retaining groove.

5. The antenna mounting system of claim 2, wherein the disk portion having a retaining member cutout section for at least one retaining attachment section, the retaining member cutout section located between the first retaining wall and the second retaining wall of the at least one retaining attachment section.

6. The antenna mounting system of claim 1, wherein the disk portion further includes a second surface configured to engage a surface of an antenna.

7. An antenna mounting system comprising:
a base member, the base member including,
a disk portion having a first surface and a second surface, the disk portion having a central passage configured to receive an antenna shaft;
a sidewall extending from the first surface of the disk portion at least partially around the central passage;
a plurality of spaced retaining attachment sections coupled the disk portion and sidewall; and
a retaining member coupled to each retaining attachment section, the retaining member having an engagement portion configured to engage an upper surface of a ceiling and a biasing portion configured to provide a bias force on the engagement portion to engage the upper surface of the ceiling, each retaining attachment section further including,
a first retaining wall;
a second retaining wall spaced from the first retaining wall, the first retaining wall and the second retaining wall at least in part extending from the sidewall towards the central passage;
a first retaining arm extending from the first retaining wall, the first retaining arm configured to hold a first portion of the biasing portion of the retaining member; and
a second retaining arm extending from the second retaining wall, the second retaining arm configured to hold a second portion of the biasing portion of the retaining member, further wherein the first retaining arm extends from the first retaining wall towards the second retaining arm and the second retaining arm extends from the second retaining wall towards the first retaining arm.

8. The antenna mounting system of claim 7, further comprising: a ledge portion coupled to an end of the second retaining wall, the ledge portion including a retaining groove.

9. The antenna mounting system of claim 7, wherein the disk portion having a retaining member cutout section for each retaining attachment section, each retaining member cutout section located between the first retaining wall and the second retaining wall of an associated retaining attachment section.

10. The antenna mounting system of claim 7, further comprising:
a ring portion defining the central passage, the ring portion attached to the disk portion of the base member via opposable positioned attaching members.

11. An antenna mounting system and antenna for a distributed antenna system, the system comprising:
a base member including a disk portion having a first surface and a second surface, the disk portion having a central passage;
a plurality of spaced retaining attachment sections coupled the first surface of the disk portion around the central passage;
a retaining member coupled to each retaining attachment section, the retaining member having an engagement portion configured to engage an upper surface of ceiling and a biasing portion configured to provide a bias force on the engagement portion to engage the upper surface of the ceiling; and
an antenna system including,
an antenna having a first surface configured to engage the second surface of the disk portion,
an antenna shaft configured to be received within the central passage of the disk portion of the base member, and a retaining nut configured to threadably engage threads on the antenna shaft to couple the antenna system to the disk portion of the base member.

12. The system of claim 11, wherein the base member further comprises:

a sidewall extending from the first surface of the disk portion at least partially around the central passage.

13. The system of claim 12, wherein each retaining attachment section further includes:

a first retaining wall;

a second retaining wall spaced from the first retaining wall, the first retaining wall and the second retaining wall at least in part extending from the sidewall towards the central passage;

a first retaining arm extending from the first retaining wall, the first retaining arm configured to hold a first portion of the biasing portion of the retaining member; and a second retaining arm extending from the second retaining wall, the second retaining arm configured to hold a second portion of the biasing portion of the retaining member, further wherein the first retaining arm extends from the first retaining wall towards the second retaining arm and the second retaining arm extends from the second retaining wall towards the first retaining arm.

14. The system of claim 13, further comprising:

a ledge portion coupled to an end of the second retaining wall, the ledge portion including a retaining groove.

15. The system of claim 13, wherein the disk portion having a retaining member cutout section for each retaining attachment section, each retaining member cutout section located between the first retaining wall and the second retaining wall of an associated retaining attachment section.

16. The system of claim 11, further comprising:

a ring portion defining the central passage, the ring portion attached to the disk portion of the base member via opposable positioned attaching members.

* * * * *